United States Patent
Grafton

(10) Patent No.: US 6,814,384 B2
(45) Date of Patent: Nov. 9, 2004

(54) SLIDING TRAY TRUNK FOR A VEHICLE

(76) Inventor: Robert D. Grafton, 2264 N. Virazon Dr., La Habra Heights, CA (US) 90631

( * ) Notice: Subject to any disclaimer, the term of this patent is extended or adjusted under 35 U.S.C. 154(b) by 0 days.

(21) Appl. No.: 10/320,673

(22) Filed: Dec. 17, 2002

(65) Prior Publication Data

US 2004/0124653 A1 Jul. 1, 2004

(51) Int. Cl.$^7$ ................................................ B60R 9/00
(52) U.S. Cl. ................................................... 296/37.6
(58) Field of Search ........................ 296/37.6; 224/402, 224/403, 404

(56) References Cited

U.S. PATENT DOCUMENTS

| | | | |
|---|---|---|---|
| 4,993,771 A | 2/1991 | Ingerson | 296/37.6 |
| 5,037,153 A * | 8/1991 | Stark | 296/37.6 |
| 5,121,959 A | 6/1992 | King | 296/37.6 |
| 5,299,722 A | 4/1994 | Cheney | 224/273 |
| 5,439,150 A | 8/1995 | Trahms | 224/404 |
| 5,484,092 A | 1/1996 | Cheney | 224/404 |
| 5,598,961 A * | 2/1997 | Sills | 224/404 |
| 6,460,744 B2 * | 10/2002 | Lance et al. | 296/37.6 |
| 6,513,851 B2 * | 2/2003 | Henderson | 296/37.6 |

\* cited by examiner

*Primary Examiner*—Jason Morrow
(74) *Attorney, Agent, or Firm*—Park & Sutton LLP; John K. Park

(57) ABSTRACT

A sliding tray trunk for a vehicle having a lower storage box, an upper storage box slidably attached on top of the storage box, a locking cover that secures the upper storage box over the lower storage box, and one or more stops to limit sliding of the upper storage box on the lower storage box to a predetermined distance is provided. The lower storage box has a substantially rectangular shape. The lower storage box has two rails on which the upper storage box can slide. A plurality of wheels are rotatably attached on each of the rails, and the upper storage box slides by rotation of the wheels.

17 Claims, 8 Drawing Sheets

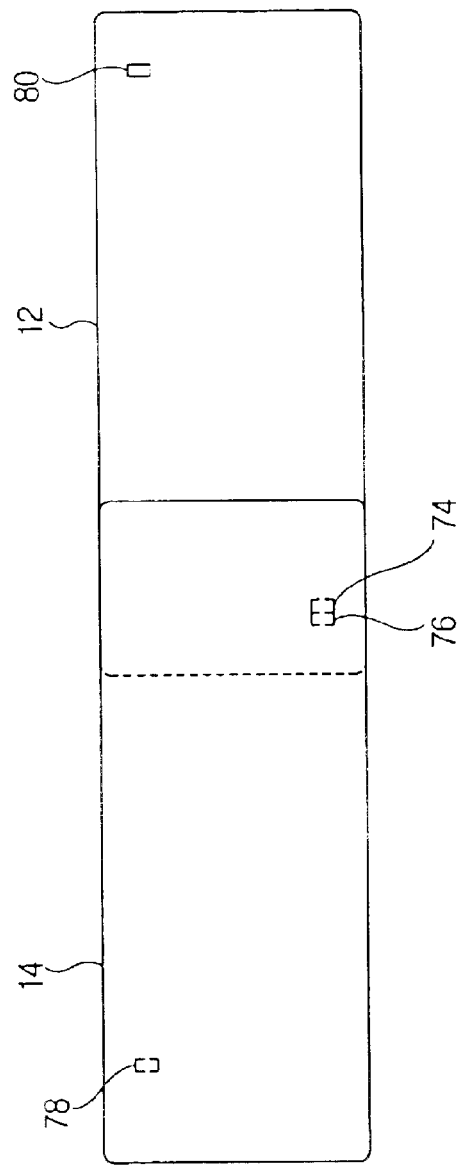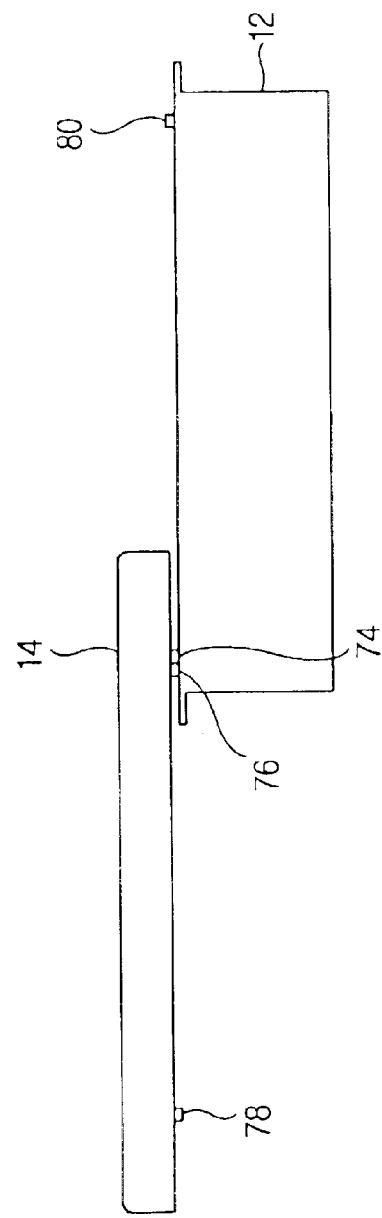

SLIDING TRAY TRUNK FOR A VEHICLE

BACKGROUND OF THE INVENTION

The present invention relates to a storage trunk for a truck. More particularly, the invention relates to a two-compartment storage trunk for a truck that provides enhanced accessibility to the inside of the trunk.

Pickup truck cross bed tool/storage boxes have been in use for many years in various shapes, sizes and materials. In general, all have a common design feature which allows the user to access the contents of the box from the top by standing at the side or climbing into the bed of the vehicle. Because of the design nature of these cross bed boxes, contents are often difficult to access because the user must reach over the higher sides of the cross bed box or climb into the rear of the vehicle to reach contents. Several prior art trunks for pickup trucks are explained below.

U.S. Pat. No. 4,993,771 to Ingerson et al. discloses a trunk for pickup trucks having a horizontally slidable panel across the top of the trunk. The storage space of the trunk is not partitioned thus creating a disorganized mix of large and small items.

U.S. Pat. No. 5,121,959 to King disclose a slide mount for moving a trunk to the rear of the vehicle within the bed of a pickup truck. In order to slide the trunk to the rear, the storage area of the bed should be completely cleared.

U.S. Pat. No. 5,299,722 to Cheney discloses a trunk having a rectangular box and a lower lid hinged on the box. An upper lid is hinged on the lower lid. The space between the lower lid and the upper lid may be used for storing slim items.

U.S. Pat. No. 5,439,150 to Trahms discloses a trunk having a box covered with pivotable top parts to allow access into the box. The user should reach through the top parts to access contents in the box.

U.S. Pat. No. 5,484,092 to Cheney discloses a trunk having a first larger storage compartment and a second smaller storage compartment that is positioned inside the first compartment.

SUMMARY OF THE INVENTION

The present invention contrives to provide a trunk for pickup truck that implements effective portioning of storage space and superior accessibility from positions convenient to the user.

Therefore, an object of the invention is to provide a two-compartment trunk in which the upper compartment is movable on the lower compartment to allow easy access into both compartments.

Another object of the invention is to provide a mechanism for stable and smooth movement of the upper compartment.

Still another object of the invention is to provide a trunk that maximizes storage space in the upper compartment.

Still another object of the invention is to provide a trunk that has accessibility to contents of the upper compartment from either side of the vehicle.

Still another object of the invention is to provide a trunk that has accessibility to the lower compartment without bending over the upper compartment.

To achieve the above-described objects, the invention provides a sliding tray trunk for a vehicle that comprises a lower storage box, an upper storage box slidably attached on top of the storage box, and a stop device to limit sliding of the upper storage box on the lower storage box to a predetermined distance.

The lower storage box has a substantially rectangular shape, and has a front wall, a rear wall, two side walls, a bottom wall, and a top wall. The top wall has an opening to allow access into the lower storage box, and two rails on which the upper storage box can slide.

The two rails protrude upward from the top wall and extend parallel with the front wall and the rear wall.

A plurality of wheels are rotatably attached on each of the rails, and the upper storage box slides by rotation of the wheels. Each of the plurality of wheels comprises a shaft rotatably attached on one of the rails, and a plastic ring surrounding the shaft and fixed to the shaft. Preferably, the wheels are impregnated with grease.

The upper storage box has a substantially rectangular shape and comprises a front wall, a rear wall, two side walls, a bottom wall, and a cover. The cover is pivotally attached to the rear wall of the upper storage box. The bottom wall of the upper storage box comprises two recesses for receiving the wheels of the lower storage box. Each of the recesses comprises a horizontal wall that contacts the wheels such that the wheels can roll on the horizontal wall when the upper storage box slides, a vertical wall that extends downward from the horizontal wall, and a horizontal flange that extends horizontally from the vertical wall toward the rail.

Each of the recesses further comprises a vertical flange that extends downward from the horizontal wall, and is oppositely positioned with the vertical wall such that each of the recesses substantially surrounds the wheels.

One or more gas-operated springs are installed between the cover and the side walls of the upper storage box to facilitate opening and closing of the cover.

The cover comprises a tool tray that is pivotally attached under the cover. The tool tray pivots downward when the cover is opened, and remains horizontal during the full travel range of the cover between the closed and open positions.

The cover further comprises reinforcements, and the tool tray is positioned between the reinforcements.

The stop device of the sliding tray trunk includes two spring-loaded handles positioned on the side walls of the upper storage box, snap protrusions, a link connecting the handles and the snap protrusions, and recesses provided in one of the rails of the lower storage box for receiving the snap protrusions. Grasping one of the handles lifts the snap protrusions out of the recesses so that the upper storage box can slide on the rails, and releasing the handle makes the snap protrusions snap into the recesses when the snap protrusions are aligned with the recesses.

The recesses are positioned at the center of the rail and at predetermined distances from the center of the rail. Therefore, the upper storage box stops sliding at the center of the rail or at the predetermined distances from the center.

To ensure safety related to the sliding operation of the upper storage box, the stop device further includes a first protrusion fixed at the bottom wall of the upper storage box near the front wall of the upper storage box, a first stop fixed at the top wall of the lower storage box near the front wall of the lower storage box, a second protrusion fixed at the bottom wall of the upper storage box near the rear wall of the upper storage box, and a second stop fixed at the top wall of the lower storage box near the rear wall of the lower storage box, in the manner that the sliding of the upper storage box is blocked when the first protrusion abuts the first stop, or the second protrusion abuts the second stop allowing the upper storage box to be slid in either direction with a positive safety stop limiting travel.

The cover of the upper storage box has a top plate and two side plates connected with the top plate. When the cover is closed, the side plates are positioned near ends of the rails, and block sliding of the upper storage box.

The front wall of the upper storage box has a pin, and the cover of the upper storage box has a latch engaging with the pin so that the cover of the upper storage box can be locked to and unlocked from the upper storage box.

The advantages of the present invention are numerous in that: (1) the user can access into the upper storage box outside the bed of the truck; (2) use of the space inside the upper storage box is maximized; (3) the user can access into the lower storage box without climbing onto the bed; (4) although the user will still need to bend over the side of the vehicle to access the contents of the lower box but he/she will not have to reach over the lip or side of the upper storage box because it has been pushed away; and (5) the user can access into the trunk at either side of the truck.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 18 is a schematic plan view showing the safety stop when the upper storage box is slid to the driver's side; and FIG. 19 is a schematic elevational view showing the safety stop.

DETAILED DESCRIPTION OF THE PREFERRED EMBODIMENTS

Figure 1:
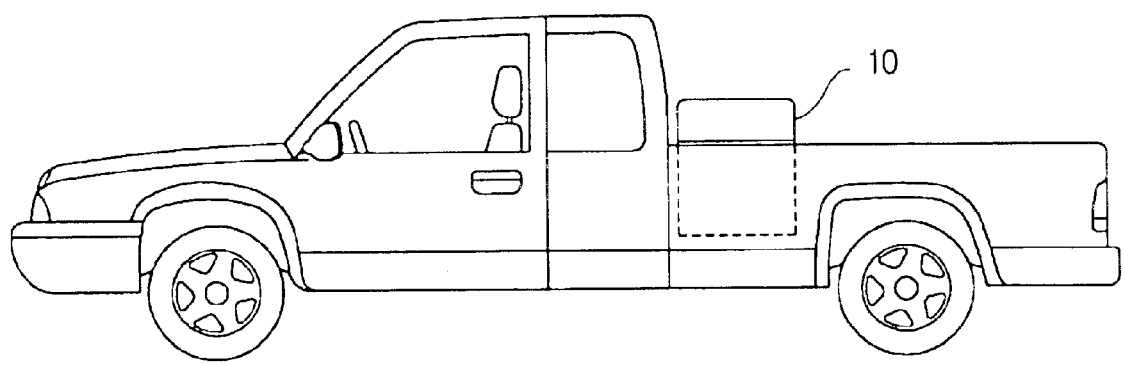
FIG. 1 is a side elevational view of a vehicle on which the sliding tray trunk of the present invention is installed.
Figure 2:
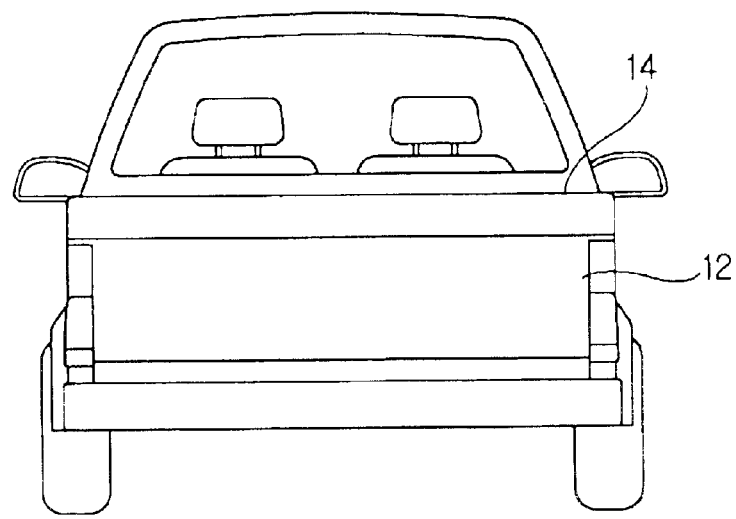
FIG. 2 is a rear elevational view of the vehicle and the trunk showing a lower storage box, and an upper storage box.

FIG. 1 shows a pick up truck on which a sliding tray trunk 10 of the present invention is installed. FIG. 2 shows the trunk 10 has a lower storage box 12 and an upper storage box 14. The lower storage box 12 is mounted on the sides of the pickup truck and is suspended over the bed.

Figure 3:
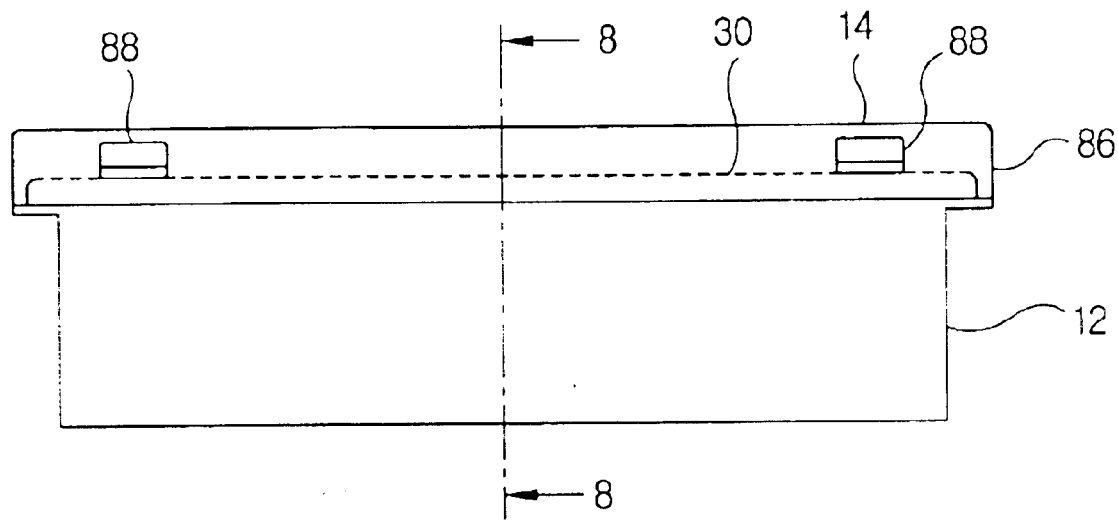
FIG. 3 is a front elevational view of the trunk with the upper storage box locked.
Figure 4:
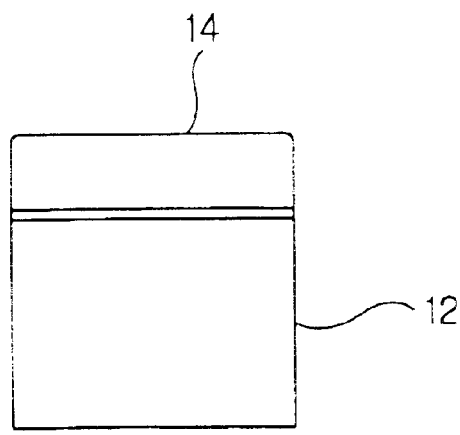
FIG. 4 is a side elevational view of the trunk.

FIGS. 3 and 4 show that the upper storage box 14 is secured on top of the lower storage box 12. Except when a user wants to access the contents in either of the upper storage box 14 and the lower storage box 12, the upper storage box 14 is secured to the lower storage box 12 by a lock that is explained later referring to FIG. 15. The lock also prevents the upper storage box 14 from rattling when the truck moves.

Figure 5:
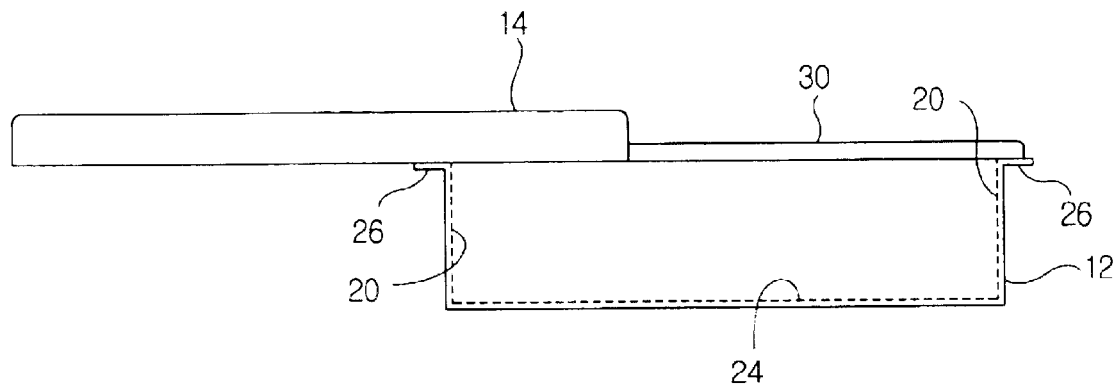
FIG. 5 is a front elevational view of the trunk with the upper storage box slid to the driver's side.
Figure 6:
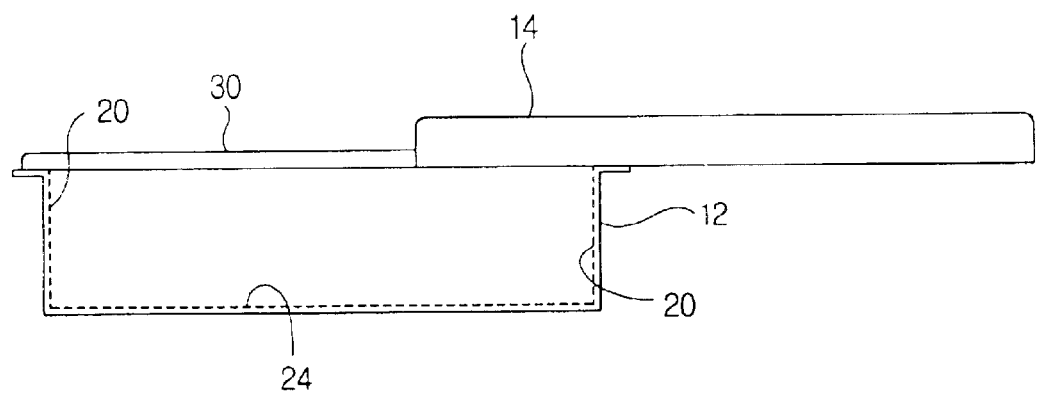
FIG. 6 is a front elevational view of the trunk with the upper storage box slid to the passenger's side.
Figure 7:
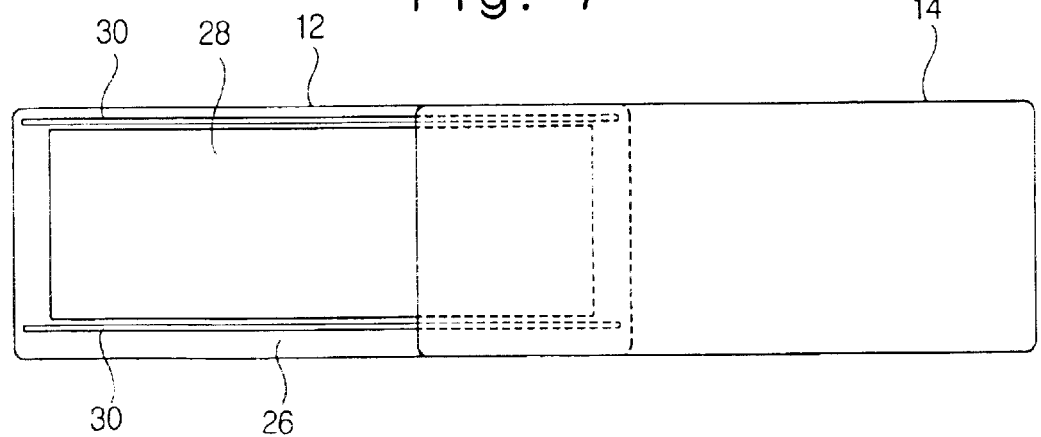
FIG. 7 is a top view of the trunk with the upper storage box slid to the passenger's side.

FIG. 5 shows that the upper storage box 14 is slid to the left. This corresponds to driver's side of the vehicle and the street side. FIGS. 6 and 7 show that the upper storage box 14 is slid to the right. This corresponds to passenger's side of the vehicle and the curbside. The sliding distance of the upper storage box 14 is limited to a predetermined distance by a stop device that is explained later referring to FIGS. 16 and 17. The predetermined distance is chosen such that the upper storage box 14 is rigidly supported by the lower storage box 12 even when the upper storage box 14 is slid up to the predetermined distance. Preferably, the predetermined distance is two thirds of the length of the upper storage box 14.

Figure 8:
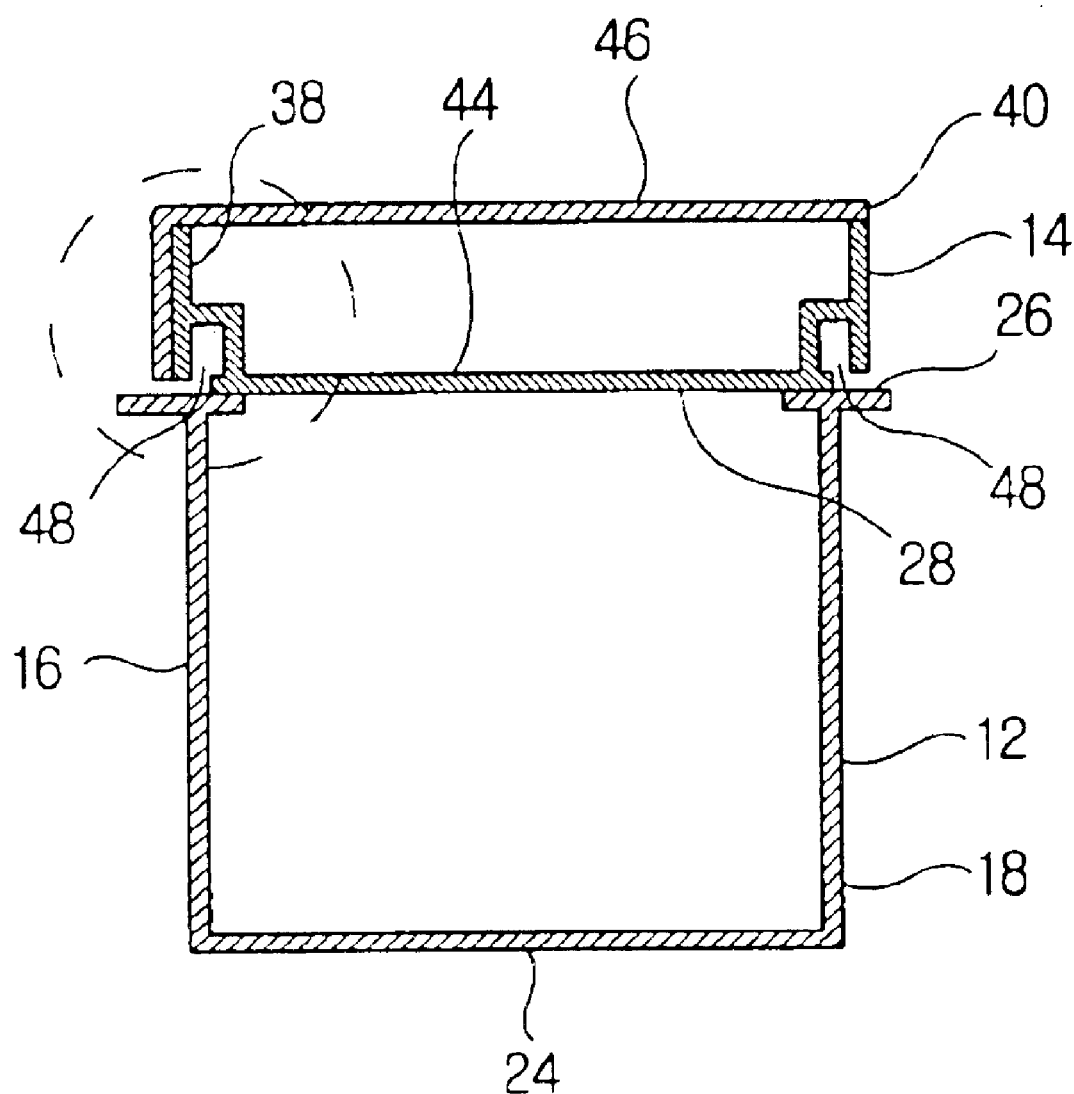
FIG. 8 is a cross-sectional view taken along the line 8—8 of FIG. 3.

FIG. 8 shows a mechanism for sliding the upper storage box 14 on top of the lower storage box 12. The lower storage box 12 has a substantially rectangular shape, and comprises a front wall 16, a rear wall 18, two side walls 20 (refer to FIGS. 5 and 6), a bottom wall 24, and a top wall 26. The top wall 26 comprises an opening 28 to allow access into the lower storage box 12, and two rails 30 on which the upper storage box 14 can slide. The two rails 30 protrude upward from the top wall 26 and extend parallel with the front wall 16 and the rear wall 18.

Figure 10:
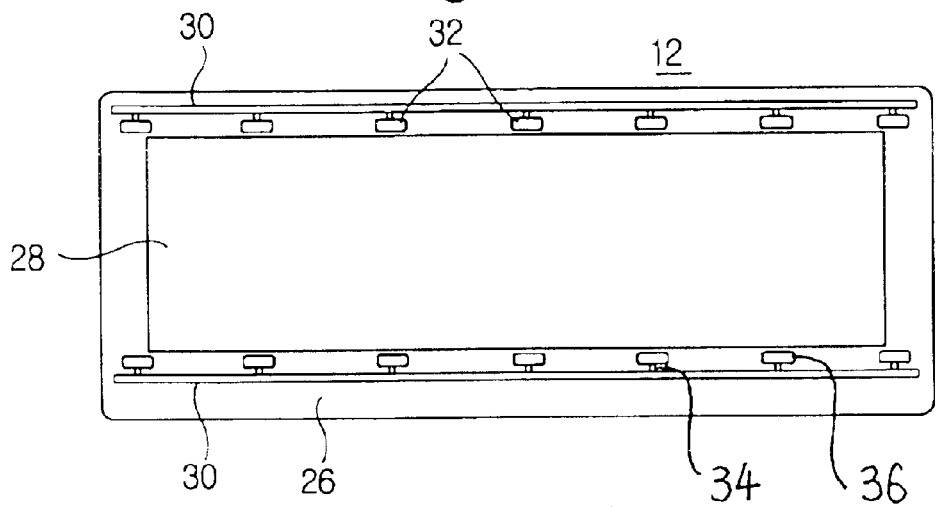
FIG. 10 is a top view of the lower storage box.

As shown in FIG. 10, a plurality of wheels 32 are rotatably attached on each of the rails 30, and the upper storage box 14 slides on the lower storage box 12 by rotation of the wheels 32. Preferably, the number of wheels 32 is twelve on each rail 30. The number of wheels may vary with the design size of the storage trunk in order to accommodate various vehicle sizes.

Each of the plurality of wheels 32 comprises a shaft 34 rotatably attached on one of the rails 30, and a plastic ring 36 surrounding the shaft 34 and fixed to the shaft 34. The plastic ring 36 provides smooth and silent sliding movement of the upper storage box 14. Preferably, the plastic ring 36 is made of Nylon. The wheels 32 may be impregnated with grease. Thus, the wheels 32 are self-lubricated, and rattles and squeaks are inhibited further.

Figure 11:
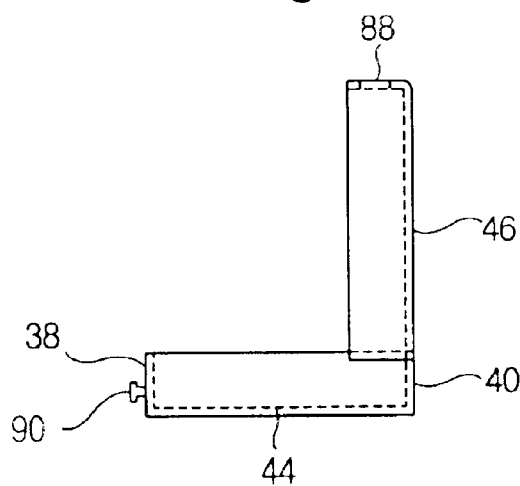
FIG. 11 is a side elevational view of the upper storage box with the cover fully opened.
Figure 12:
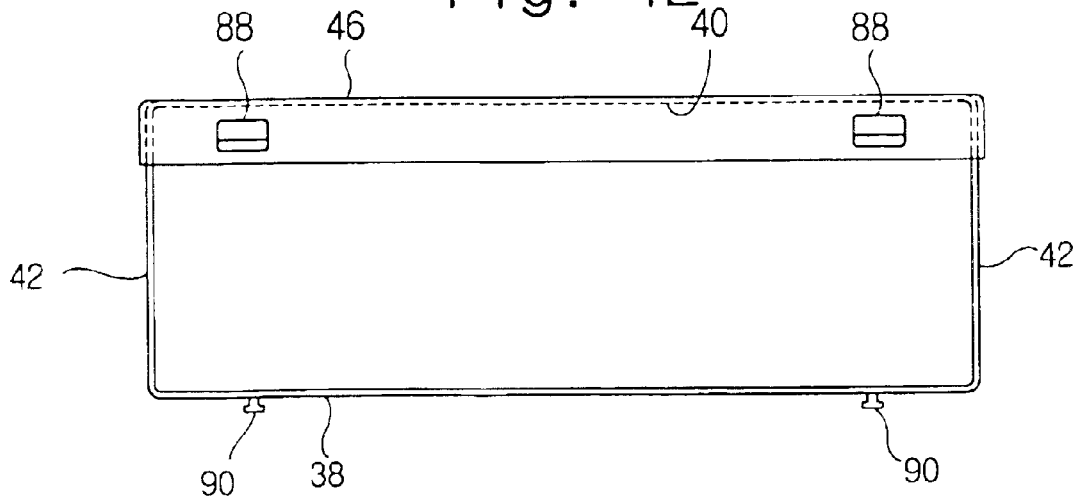
FIG. 12 is a top view of the upper storage box with the cover fully opened.

As shown in FIGS. 11 and 12, the upper storage box 14 has a substantially rectangular shape and comprises a front wall 38, a rear wall 40, two side walls 42, a bottom wall 44, and a cover 46. The cover 46 is pivotally attached to the rear wall 40.

Referring back to FIG. 8, the bottom wall 44 has two recesses 48 for receiving the wheels 32 of the lower storage box 12. Each of the recesses 48 has a horizontal wall that contacts the wheels 32 such that the wheels 32 can roll on the horizontal wall when the upper storage box 14 slides, a vertical wall that extends downward from the horizontal wall, a horizontal flange that extends horizontally from the vertical wall toward the rail 30. The horizontal flange prevents the upper storage box 14 from being lifted upward from the lower storage box 12. The recess 48 further has a vertical flange that extends downward from the horizontal wall, and is oppositely positioned with the vertical wall such that the recess 48 substantially surrounds the wheel 32. In this way, the upper storage box 14 is properly guided when it is slid. The wheels 32 provide smooth movement of the upper storage box 14. The clearances or tolerances between the wheels 32 and the vertical wall and the horizontal flange 54 are made as small as possible, thereby minimizing lateral or vertical movement of the upper storage box 14 in relation to the lower storage box 12. The wheels 32 and the recesses 48 rigidly support the upper storage box 14 even when the upper storage box 14 is slid to the fully opened position.

Figure 14:
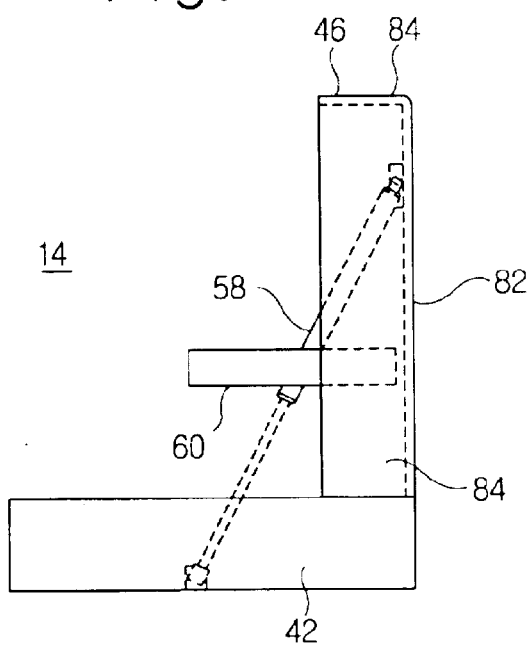
FIG. 14 is a view similar to FIG. 13 but with the cover opened and the tool tray is lowered.
Figure 15:
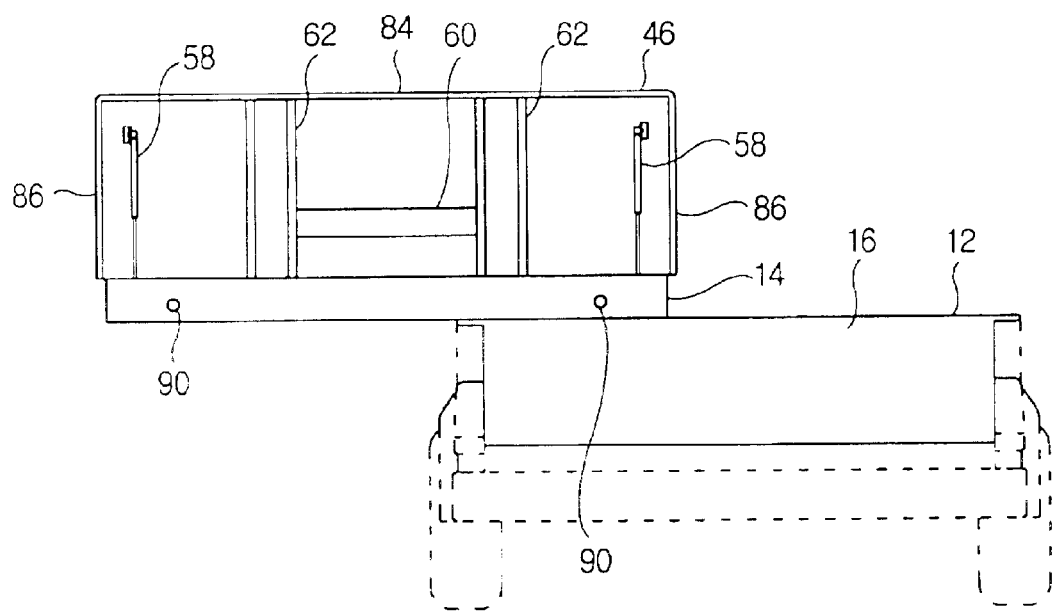
FIG. 15 is a rear view of the trunk with the upper storage box slid to the driver's side, and the cover open.

FIGS. 14 and 15 show that two gas-operated springs 58 are installed between the cover 46 and the side walls 42 of the upper storage box 14 to facilitate opening and closing of the cover 46.

A tool tray 60 is pivotally attached under the cover 46. The tool tray 60 provides a storage space for frequently used tools. The tool tray pivots downward when the cover 46 is opened, and becomes and remains horizontal during the full travel range of the cover 46 between the closed and open position. This pivoting of the tool tray 60 may be guided and limited by a wire, a rope or a hinge.

The cover 46 further has reinforcements 62 to strengthen the cover 46. The tool tray 60 is positioned between the reinforcements 62.

Figure 16:
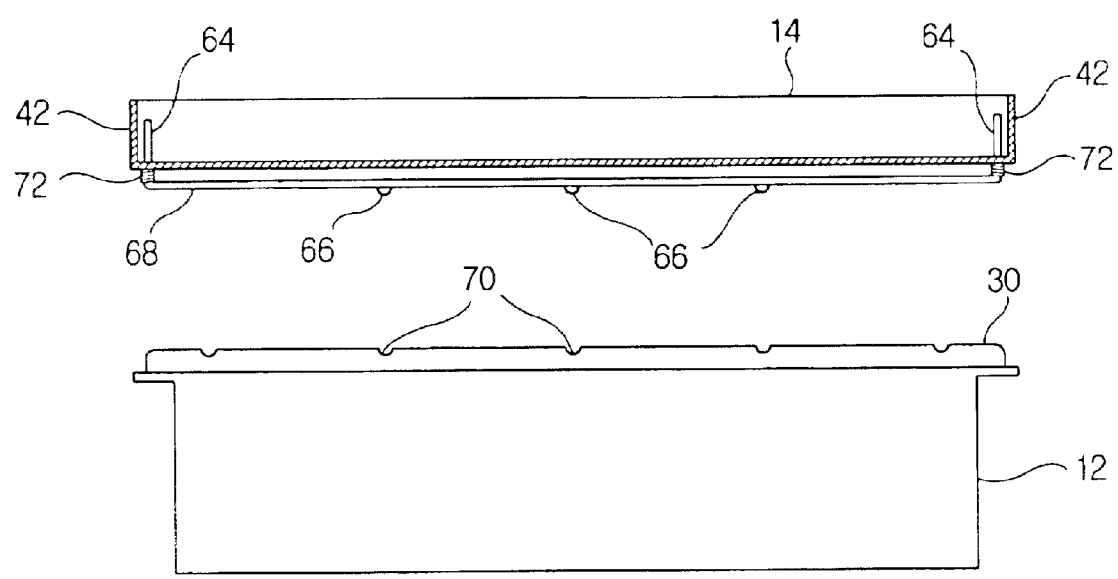
FIG. 16 is a schematic elevational view showing a stop device for the sliding tray trunk.

FIG. 16 shows that the stop device of the trunk 10 includes two spring-loaded handles 64 positioned on the side walls 42 of the upper storage box 14, a plurality of snap protrusions 66, a link 68 connecting the handles 64 and the snap protrusions 66, and a plurality of recesses 70 provided in one of the rails 30 of the lower storage box 12 for receiving the snap protrusions 66. The handles 64 are spring-loaded by springs 72.

In order to slide the upper storage box 14, the user grasps and lifts the handle 64 on either side of the truck. Then the link 68 lifts the snap protrusions 66 out of the recesses 70 so that the upper storage box 14 can slide on the rails 30. When the user releases the handle 64, by the returning force of the springs 72, the link 68 forces the snap protrusions 66 down, and the snap protrusions 66 snap into the recesses 70 as soon as the snap protrusions 66 are aligned with the recesses 70, and the sliding stops. The recesses 70 are positioned at the center of the rail 30 and at predetermined distances from the center of the rail 30. In this way, the upper storage box 14 stops sliding at the center of the rail 30 or at the predetermined distances from the center of the rail 30. The predetermined distances correspond to being slid one-half open or full opened. Even if the cover 46 was inadvertently left open and the driver moved the vehicle causing the upper storage box 14 to slide in either direction, the sliding would stop when the snap protrusions 66 snap into the nearest recesses 70.

Figure 17:
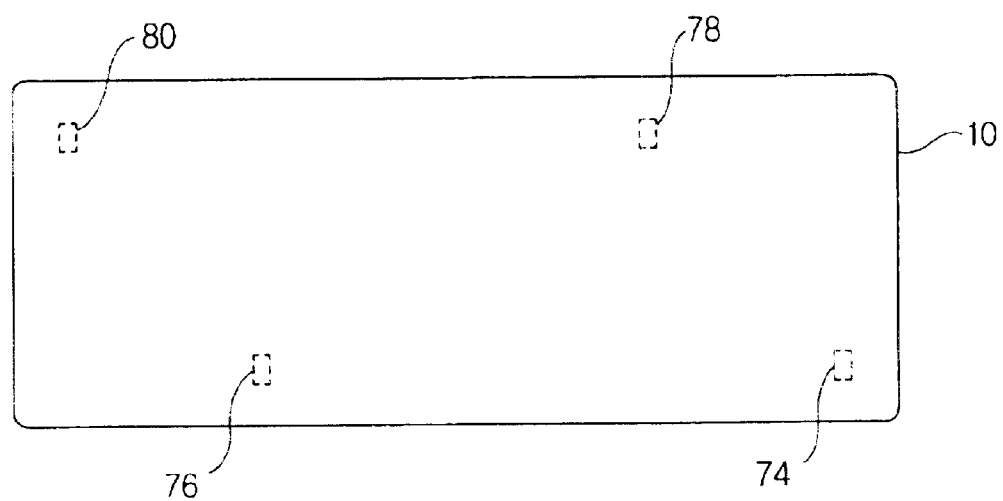
FIG. 17 is a schematic plan view showing a safety stop for the sliding tray trunk when the upper storage box is centered.

FIGS. 17–19 show a safety stop that prevents the upper storage box 14 from separating from the lower storage box 12 and falling to the ground. The safety stop includes a first protrusion 74 fixed at the bottom wall 44 of the upper storage box 14 near the front wall 38 of the upper storage box 14, a first stop 76 fixed at the top wall 26 of the lower storage box 12 near the front wall 16 of the lower storage box 12, a second protrusion 78 fixed at the bottom wall 44 of the upper storage box 14 near the rear wall 40 of the upper storage box 14, and a second stop 80 fixed at the top wall 26 of the lower storage box 12 near the rear wall 18 of the lower storage box 12. In this way, the sliding of the upper slide box 14 is blocked when the first protrusion 74 abuts the first stop 76 in case that the upper storage box 14 is slid to the driver side as shown in FIGS. 18 and 19, or when the second protrusion 78 abuts the second stop 80 in case that the upper storage box 14 is slid to the passenger side. The protrusions 74, 78 and stops 76, 80 are positioned to prevent the upper storage box 14 from sliding further than the fully opened position of the stop device.

Figure 13:
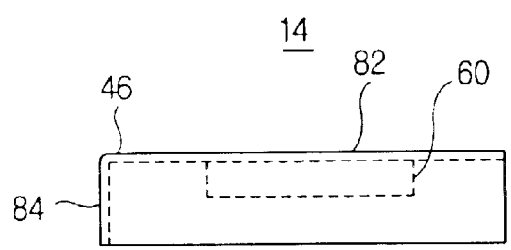
FIG. 13 is a side elevational view of the upper storage box with the cover closed.

Referring back to FIGS. 13–15, the cover 46 of the upper storage box 14 has a top plate 82, a front plate 84 and two side plates 86 connected with the top plate 82 and the front plate 84. When the cover 46 is closed, the side plates 86 are positioned near ends of the rails 30, and block sliding of the upper storage box 14. FIG. 3 shows this state. The cover 46 can be closed only when the upper storage box 14 is centered on the lower storage box 12.

FIG. 15 shows that the cover 46 of the upper storage box 14 has one or more latches or locks 88 on its front plate 84, and the front wall 38 of the upper storage box 14 has one or more pins 90 engaging with the latches 88 so that the cover 46 of the upper storage box 14 can be locked to and unlocked from the upper storage box 14. A commercially available rotary latch can be used as the latch 88.

With the above trunk, the necessity of climbing onto the bed of the vehicle and reaching over the higher side of the top portion of the trunk is eliminated. The trunk allows for increased and segregated storage in the upper sliding storage box of the trunk. The trunk allows making use of full space inside the upper storage box since the user can access into the lower storage box without passing through the upper storage box. Since the upper storage box can be pulled out over either side of the vehicle, all contents stored in the upper storage box can be easily reached with no need to walk around to the far side of the vehicle, and the user can choose street or curbside access depending on the user's preference and working conditions. Sliding away of the upper storage box either toward or away from user allows easy access to contents stored in the lower storage box from either side of the vehicle. Sliding the upper storage box allows the user to access the contents of the lower storage box without reaching over the additional height of the upper storage box thus allowing further reach into the middle of the lower storage box. Access to the lower storage box is improved particularly on vehicles with higher bed sides. The trunk allows for separation of small tools and equipment from large and/or bulky items. The trunk also facilitates access to the stored contents even when the vehicle bed is filled with items.

The upper storage box will slide off either side of the vehicle allowing the user to stand directly in front of and over items stored without having to reach over and across the bed of the carrying vehicle. The sliding of the storage box allows access to items stored opposite the user's position without requiring the user to walk around to the other side of the vehicle to access items on that side of the storage tray. Because no access to the lower storage box is required through the upper storage box, the use of storage space in the upper storage box can be maximized, and the upper storage box can be organized to fit any manner of trade or hobby as the user may wish through the user of dividers, additional trays, removable trays, mounting points, etc. Because there is no need to reach through the top portion of the trunk to get to the contents of the lower portion of the trunk, a permanent bottom is allowed on the upper storage box across the entire length thereof. This full bottom along the entire length may be used for attaching permanent mounting brackets for small tools.

Although the invention has been described in considerable detail, other versions are possible by converting the aforementioned construction. Therefore, the scope of the invention shall not be limited by the specification specified above.

What is claimed is:

1. A sliding tray trunk for a vehicle comprising:
   a) a lower storage box;
   b) an upper storage box slidably attached on top of the lower storage box; and
   c) a stop device to limit sliding of the upper storage box on the lower storage box to a predetermined distance;
   wherein the lower storage box has a substantially rectangular shape, and comprises a front wall, a rear wall, two side walls, a bottom wall, and a top wall, wherein the top wall comprises an opening to allow access into the lower storage box, and two rails on which the upper storage box can slide, and wherein the two rails protrude upward from the top wall and extend parallel with the front wall and the rear wall.

2. The sliding tray trunk of claim 1 wherein a plurality of wheels are rotatably attached on each of the rails, and the upper storage box slides by rotation of the wheels.

3. The sliding tray trunk of claim 2 wherein each of the plurality of wheels comprises a shaft rotatably attached on one of the rails, and a plastic ring surrounding the shaft and fixed to the shaft.

4. The sliding tray trunk of claim 2 wherein the upper storage box has a substantially rectangular shape and comprises a front wall, a rear wall, two side walls, a bottom wall, and a cover, wherein the cover is pivotally attached to the rear wall of the upper storage box, wherein the bottom wall of the upper storage box comprises two recesses for receiving the wheels of the lower storage box.

5. The sliding tray trunk of claim 4 wherein one or more gas-operated springs are installed between the cover and the side walls of the upper storage box to facilitate opening and closing of the cover.

6. The sliding tray trunk of claim 4 wherein the cover comprises a tool tray that is pivotally attached under the cover.

7. The sliding tray trunk of claim 6 wherein the tool tray pivots downward when the cover is opened, and is kept horizontal during the full travel range of the cover.

8. The sliding tray trunk of claim 6 wherein the cover further comprises reinforcements, and the tool tray is positioned between the reinforcements.

9. The sliding tray trunk of claim 4 wherein the stop device comprises two spring-loaded handles positioned on the side walls of the upper storage box, a plurality of snap protrusions, a link connecting the handles and the snap protrusions, and a plurality of recesses provided in one of the rails of the lower storage box for receiving the snap protrusions, wherein grasping one of the handles lifts the snap protrusions out of the recesses so that the upper storage box can slide on the rails, and releasing the handle makes the snap protrusions snap into the recesses when the snap protrusions are aligned with the recesses.

10. The sliding tray trunk of claim 9 wherein the recesses are positioned at the center of the rail and at predetermined distances from the center of the rail, whereby the upper storage box stops sliding at the center of the rail or at the predetermined distances from the center.

11. The sliding tray trunk of claim 4 wherein the stop device comprises a first protrusion fixed at the bottom wall of the upper storage box near the front wall of the upper storage box, a first stop fixed at the top wall of the lower storage box near the front wall of the lower storage box, a second protrusion fixed at the bottom wall of the upper storage box near the rear wall of the upper storage box, and a second stop fixed at the top wall of the lower storage box near the rear wall of the lower storage box, in the manner that the sliding of the upper storage box is blocked when the first protrusion abuts the first stop, or the second protrusion abuts the second stop.

12. The sliding tray trunk of claim 9 wherein the stop device further comprises a first protrusion fixed at the bottom wall of the upper storage box near the front wall of the upper storage box, a first stop fixed at the top wall of the lower storage box near the front wall of the lower storage box, a second protrusion fixed at the bottom wall of the upper storage box near the rear wall of the upper storage box, and a second stop fixed at the top wall of the lower storage box near the rear wall of the lower storage box, in the manner that the sliding of the upper storage box is blocked when the first protrusion abuts the first stop, or the second protrusion abuts the second stop.

13. The sliding tray trunk of claim 4 wherein the cover of the upper storage box has a top plate and two side plates connected with the top plate, wherein when the cover is closed, the side plates are positioned near ends of the rails, and the side plates block sliding of the upper storage box.

14. The sliding tray trunk of claim 4 wherein the cover of the upper storage box has a latch, and the front wall of the upper storage box has a pin engaging with the latch so that the cover of the upper storage box can be locked to and unlocked from the upper storage box.

15. The sliding tray trunk of claim 12 wherein the cover of the upper storage box has a top plate and two side plates connected with the top plate, wherein when the cover is closed, the side plates are positioned near ends of the rails, and the side plates block sliding of the upper storage box.

16. The sliding tray trunk of claim 15 wherein the cover of the upper storage box has a latch, and the front wall of the upper storage box has a pin engaging with the latch so that the cover of the upper storage box can be locked to and unlocked from the upper storage box.

17. The sliding tray trunk of claim 2 wherein the wheels are impregnated with grease.

* * * * *